United States Patent Office 3,178,440
Patented Apr. 13, 1965

3,178,440
NEW 1:3:4-THIADIAZOLES
Adolf Emil Siegrist, Basel, Erwin Maeder, Munchenstein, Max Duennenberger, Birsfelden, and Peter Liechti, Binningen, Switzerland, assignors to Ciba Limited, Basel, Switzerland, a company of Switzerland
No Drawing. Filed Feb. 28, 1961, Ser. No. 92,133
Claims priority, application Switzerland, Mar. 1, 1960, 2,307/60
12 Claims. (Cl. 260—294.8)

The present invention provides new 1:3:4-thiadiazoles of the formula (1)
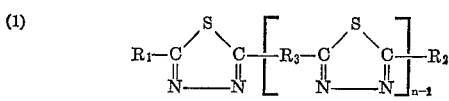

where $R_1$, $R_2$ and $R_3$ each represents an aromatic or heterocyclic radical, of which at least one is heterocyclic, and $n=1$ or 2.

The new thiadiazoles of the Formula 1 are advantageously prepared by reacting an acylhydrazine of the formula (2)
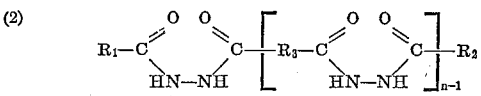

where $R_1$, $R_2$, $R_3$ and $n$ have the above meanings—with a phosphorus sulfide, preferably in the presence of a tertiary nitrogen base.

The acylhydrazines used as starting material are derived from hydrazine and at least one heterocyclic carboxylic acid and inasmuch as the radicals $R_1$, $R_2$ or $R_3$ are aromatic, from aromatic carboxylic acids. $R_1$ and $R_2$ are derived from monocarboxylic acids and $R_3$ is derived from a dicarboxylic acid.

Particularly suitable are those heterocylic monocarboxylic acids supplying the radicals $R_1$ and/or $R_2$ which contain only one ring, for example a five-membered or six-membered ring with preferably a single hetero atom (nitrogen, oxygen or sulfur) and 2 or 3 cyclic double bonds. Special mention among the aromatic monocarboxylic acids deserve those which—like benzene-, diphenyl- and naphthalene-carboxylic acids—contain 1 or 2 aromatic rings. Among the aromatic dicarboxylic acids the benzene-dicarboxylic acids are especially suitable.

All carboxylic acids used in the manufacture of the acylhydrazines—and above all the monocarboxylic acids of the benzene series—may contain further, preferably non-cyclic substituent, for example halogen atoms such as bromine or chlorine, alkyl groups such as methyl, ethyl, n-propyl, isopropyl or tertiary butyl, or alkoxy groups such as methoxy or ethoxy.

From the foregoing it will be realized that it is of special advantage to use as starting material acylhydrazines of the Formula 2, where $R_1$, $R_2$ and $R_3$ each represents an aromatic radical containing 1 to 2 aromatic six-membered rings, or heterocyclic radicals containing a single five-membered or six-membered heterocycle and at least one of the radicals $R_1$, $R_2$, $R_3$ is heterocyclic. Thus, for example, in the acylhydrazines of the Formula 2, $R_1$ and $R_2$ may be benzene, diphenyl, naphthalene, pyridine, furan or thiophene radicals, while $R_3$ is a benzene, furan or thiophene radical, but at least one of these radicals must be heterocyclic. From the foregoing it will be readily realized what the preferred constitution of the thiadiazoles of the Formula I is.

The diacylhydrazines of the Formula 2 containing a single hydrazine radical ($n=1$) are advantageously prepared by diacylating hydrazine hydrate or a suitable hydrazine salt, such as hydrazine sulfate, with a halide, preferably the chloride, of a heterocyclic monocarboxylic acid, or by first monoacylating such a hydrazine compound with an ester of a monocarboxylic acid and then further acylating the monoacylhydrazine with a halide of another monocarboxylic acid, for which purpose there are to be used the derivatives of two different heterocyclic monocarboxylic acids or one derivative each of a heterocyclic monocarboxylic acid and of an aromatic monocarboxylic acid. In this manner there are obtained in the first case symmetrical and in the second case asymmetrical diacylhydrazines.

Acylhydrazines of the Formula 2 containing two hydrazine radicals ($n=2$) are obtained when hydrazine is acylated in the molecular ratio of 2:1:2 on the one hand with a dicarboxylic acid ester and on the other with a monocarboxylic acid halide. Thus, for example, 2 molecular proportions of hydrazine may be converted with 1 molecular proportion of a dicarboxylic acid derivative into a compound of the formula (3)
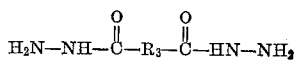

whereupon the two $H_2N$ groups of this compound are further acylated with 2 mols of a single monocarboxylic acid halide or with 1 mol each of two different monocarboxylic acid halides. It will be readily understood that also in this case the starting materials must be chosen so that the resulting acyl compound corresponds to the Formula 2.

As monocarboxylic acids whose halides and/or esters may be used for the manufacture of the acylhydrazines of the Formula 2, the following may be mentioned: Benzenecarboxylic acids of the formula (4)
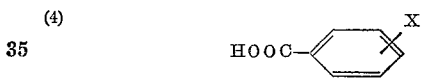

where X represents a hydrogen atom, or an alkyl group with 1 to 4 carbon atoms, or an alkoxy group with 1 to 4 carbon atoms, or a halogen atom such as bromine or preferably chlorine, or a phenyl radical, such as 2-, 3- or 4-methylbenzenecarboxylic acid,
2-, 3- or 4-chlorobenzenecarboxylic acid,
2-, 3- or 4-bromobenzenecarboxylic acid,
4-tertiary butylbenzenecarboxylic acid,
2:4-dimethylbenzenecarboxylic acid,
3:4-dimethylbenzenecarboxylic acid,
3:5-dimethylbenzenecarboxylic acid,
2:4-dichlorobenzenecarboxylic acid,
3:4-dichlorobenzenecarboxylic acid,
2-, 3- or 4-methoxybenzenecarboxylic acid,
2:4- or 2:5- or 3:4-dimethoxybenzenecarboxylic acid,
2:4:5- or 3:4:5-trimethoxybenzenecarboxylic acid,
2-, 3- or 4-ethoxybenzenecarboxylic acid,
2-methoxy-4- or 5-methylbenzenecarboxylic acid,
2-methoxy-5-chlorobenzenecarboxylic acid,
2-ethoxy-4-methylbenzenecarboxylic acid,
Diphenyl-4-carboxylic acid;
Naphthalenecarboxylic acids such as
    Naphthalene-1- or -2-carboxylic acid,
    3-methoxynaphthalene-2-carboxylic acid;
Pyridinecarboxylic acids such as pyridine-2-, -3- or -4-carboxylic acid;
Furancarboxylic acids such as
    Furan-2-carboxylic acid,
    3:4-dichlorofuran-2-carboxylic acid,
    5-chlorofuran-2-carboxylic acid;
Thiophenecarboxylic acids such as
    Thiophene-2-carboxylic acid,
    3- or 5-methylthiophene-2-carboxylic acid,
    3:5-dimethylthiophene-2-carboxylic acid,
    5-chlorothiophene-2-carboxylic acid.

As dicarboxylic acids whose halides are suitable for the manufacture of acylhydrazines containing two hydrazine radicals there may be mentioned:

Isophthalic acid,
Terephthalic acid,
1:1'-diphenyl-4:4'-dicarboxylic acid,
Furan-2:5-dicarboxylic acid,
Thiophene-2:5-dicarboxylic acid,
3:4-dimethylthiophene-2:5-dicarboxylic acid.

As phosphorus sulfides suitable for the manufacture of the thiadiazoles there may be mentioned phosphorus heptasulfide ($P_4S_7$), phosphorus sesquisulfide ($P_4S_3$), phosphorus trisulfide ($P_2S_3$) and preferably phosphorus pentasulfide ($P_2S_5$).

The reaction is preferably conducted in the presence of a tertiary nitrogen base. It is of advantage to use a tertiary nitrogen base whose boiling point is not too low, preferably at least 100° C. such, for example, as N:N-diethylaniline or N:N-dimethylaniline. Particularly suitable are cyclic tertiary nitrogen bases such as quinoline and above all pyridine bases such as pyridine itself and alkylpyridines containing lower alkyl radicals such as 2-, 3- or 4-methylpyridine (picolines), ethylpyridines or mixtures of such pyridine bases.

In other respect it is of advantage to conduct the reaction with the use of a clear excess of phosphorus sulfide over the theoretically required minimum amount of 2 atoms of sulfur required for the formation of a thiadiazole ring and at least a sufficiency of the tertiary nitrogen base such that the reaction mixture forms at first a solution or at least a readily mobile suspension. In general, the reaction is rather exothermic; it is therefore of advantage to add the phosphorus sulfide to the solution of the acylhydrazine in the tertiary base gradually at room temperature and to apply external heat only when on addition of the phosphorus sulfide the reaction mixture no longer heats up by itself. To complete the reaction it is of advantage to maintain the mixture for a few hours longer at an elevated temperature, for example between 80 and 150° C., during which as a rule the thiadiazole formed will gradually separate out. On completion of the reaction this separation can be completed by adding water and, if desired, a water-soluble organic solvent.

It is also possible to manufacture the acylhydrazines required as starting material in the present process from carboxylic acid halides and hydrazine compounds in the presence of a tertiary nitrogen base and, without intermediate isolation, to react the resulting acylhydrazine with a phosphorus sulfide. Thus, for example, in a tertiary nitrogen base, preferably a pyridine base, a symmetrical or preferably asymmetrical diacylhydrazine may be prepared from a monoacylhydrazine with the aid of a carboxylic acid halide, which is then immediately followed by the reaction with the phosphorus sulfide.

The new thiadiazoles may also be further reacted, for example sulfonated, nitrated or chlorinated. Basic compounds containing tertiary nitrogen atoms, for example such as contain pyridine rings, may also be quaternated.

The new thiadiazoles may be used for example, as agents affording protection from ultra-violet rays, as optical brighteners, as scintillators, for electrophotographic reproduction or as intermediates in the manufacture of dyestuffs.

Unless otherwise indicated, parts and percentages are by weight.

*Example 1*

30 parts of phosphorus pentasulfide are stirred into 24.1 parts of N-benzoyl-N'-isonicotinyl hydrazine in 150 parts by volume of pyridine, whereupon the reaction mixture heats up. When the exothermic reaction has subsided, the temperature is adjusted within 30 minutes to 60 to 65° C. The mixture is stirred for 1 hour at 60 to 65° C., then the temperature is raised to the refluxing point within 1 hour, and the reaction mixture is stirred on for 15 hours at a gentle boil, then cooled to room temperature. 50 parts by volume of ethanol and then 2500 parts of ice water are added in several portions, and the whole is neutralized with aqueous sodium hydroxide solution; the resulting 2-[pyridyl-(4')]-5-phenyl-1:3:4-thiadiazole of the formula (5)

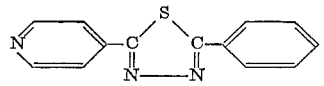

is suctioned off, washed with 2000 parts of cold water and dried, to yield about 20.6 parts (=86.2% of the theoretical yield) of colorless, shiny flakes which melt at 182 to 183° C. Three recrystallizations from ethanol+water (2:1) yield about 9.8 parts (=41% of the theoretical yield) of colorless, shiny flakes which melt at 182 to 183.2° C. and in ultra-violet light display a very weak blue fluorescence.

*Analysis.*—$C_{13}H_9N_3S$. Molecular weight: 239.29.

|  | C | H | N |
|---|---|---|---|
| Calculated, percent | 65.25 | 3.79 | 17.56 |
| Found, percent | 65.01 | 3.80 | 17.48 |

Ultra-violet absorption in dioxane: $\lambda_{max}=302$ m$\mu$ ($\epsilon=21{,}400$).

The following table lists further 1:3:4-thiadiazoles that can be prepared as described above. The yields refer to the crude product. The abbreviations in the fluorescence column have the following significance:

SS: very weak  W: white
S: weak  O: orange
M: medium  G: yellow
St: strong  Gr: green
L: brilliant  B: blue
H: light-colored  V: violet

| No. | Formula | Yield in percent | Properties | Analysis (mol. wt.) Calculated | Analysis (mol. wt.) Found | $\lambda_{max}/\epsilon$ Fluorescence |
|---|---|---|---|---|---|---|
| 6 | 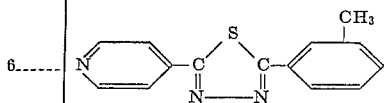 | 79.9 | Colorless, very fine, felted needles. M.P.=141.8–143.2° (ethanol-water) 5:2. | C 66.38<br>H 4.38<br>N 16.59<br>(253.31) | C 66.23<br>H 4.52<br>N 16.64 | 307/20,400<br>241/2,300<br>241/2,300<br>SS-B |
| 7 | 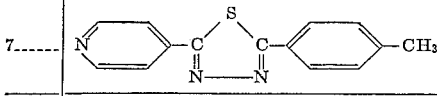 | 74.3 | Small, colorless shiny flakes and needles. M.P.=167–168.6° (ethanol-water) 5:2 | C 66.38<br>H 4.38<br>N 16.59<br>(253.31) | C 66.36<br>H 4.54<br>N 16.75 | 310/22,800<br>SS-B |
| 8 | 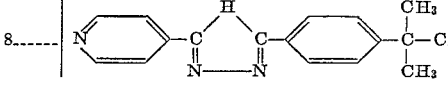 | 76.9 | Colorless, very fine needles. M.P.=167–168.5° (ethanol-water) 2:1 | C 69.12<br>H 5.80<br>N 14.23<br>(295.41) | C 69.02<br>H 5.72<br>N 14.33 | 312/24,800<br>SS-B |

| No. | Formula | Yield in percent | Properties | Analysis (mol. wt.) | | λ_max/ε Fluorescence |
|---|---|---|---|---|---|---|
| | | | | Calculated | Found | |
| 9 | pyridyl-thiadiazole-C6H3(CH3)2 (2,4-dimethylphenyl) | 80.2 | Colorless, very fine, shiny needles. M.P.=179.5–181.5° (ethanol-water) 3:1 | C 67.39<br>H 4.90<br>N 15.72<br>(267.34) | C 67.28<br>H 5.21<br>N 15.92 | 316/22,500<br>242/5,900<br><br>St-B |
| 10 | pyridyl-thiadiazole-C6H4Cl (2-Cl) | 79.2 | Colorless, very fine, shiny needles and flakes. M.P.=148.2–150° (ethanol-water) 1:1. | C 57.04<br>H 2.95<br>N 15.10<br>(273.75) | C 56.99<br>H 2.97<br>N 15.10 | 298/21,600<br><br>SS-B |
| 11 | pyridyl-thiadiazole-C6H4Cl (4-Cl) | 62.1 | Colorless, very fine, felted shiny needles. M.P.=190.6–192° (ethanol-water) 5:2. | C 57.04<br>H 2.95<br>N 15.35<br>(273.75) | C 56.93<br>H 2.94<br>N 15.22 | 309/24,800<br><br>S-B |
| 12 | pyridyl-thiadiazole-C6H4Br | 81.1 | Colorless, fine, felted needles. M.P.=222–223° (dioxane-ethanol-water 3:3:2). | C 49.07<br>H 2.53<br>N 13.21<br>(318.21) | C 48.77<br>H 2.63<br>N 13.04 | 310/26,800<br><br>SS-B |
| 13 | pyridyl-thiadiazole-C6H3Cl2 | 82.5 | Colorless, very fine, felted needles. M.P.=173–174.6° (ethanol-dioxane-water 2:1:1). | C 50.66<br>H 2.29<br>N 13.64<br>(308.20) | C 50.95<br>H 2.25<br>N 13.39 | 310/24,200<br>302/24,400<br><br>S-B |
| 14 | pyridyl-thiadiazole-C6H4OCH3 (2-OCH3) | 92.2 | Almost colorless, very fine, felted needles. M.P.=143–144° (water-ethanol) 4:1. | C 62.43<br>H 4.12<br>N 15.60<br>(269.33) | C 62.43<br>H 4.25<br>N 15.59 | 327/19,800<br>300/17,000<br><br>St-WV |
| 15 | pyridyl-thiadiazole-C6H4OCH3 (3-OCH3) | 77.7 | Colorless, very fine, felted needles. 119.6–121.4° (ethanol-water) 5:2. | C 62.43<br>H 4.12<br>N 15.60<br>(269.33) | C 62.55<br>H 3.97<br>N 15.72 | 302/21,900<br><br>M-B |
| 16 | pyridyl-thiadiazole-C6H4OCH3 (4-OCH3) | 82.8 | Colorless, fine, felted, shiny needles. M.P.=166.2–167.4° (ethanol-water) 3:1. | C 62.43<br>H 4.12<br>N 15.60<br>(269.33) | C 62.69<br>H 4.13<br>N 15.79 | 325/24,600<br><br>L-B |
| 17 | pyridyl-thiadiazole-C6H3(OCH3)(CH3) | 67 | Colorless, very small, shiny needles. M.P.=185–186.5° (ethanol-water) 7:1. | C 63.58<br>H 4.62<br>N 14.83<br>(283.34) | C 63.63<br>H 4.50<br>N 15.07 | 329/23,000<br>304/16,400<br><br>L-B |
| 18 | pyridyl-thiadiazole-C6H3(OCH3)(Cl) | 67 | Colorless, fine, felted needles. M.P.=194–195° (ethanol-water) 2:1. | C 63.58<br>H 4.62<br>N 14.83<br>(283.34) | C 63.27<br>H 4.74<br>N 14.81 | 335/16,800<br>297/16,200<br><br>L-B |
| 19 | pyridyl-thiadiazole-C6H3(OCH3)(Cl) | 56.7 | Pale yellow, shiny needles. M.P.=210.4–212.2° (dioxane-ethanol-water 2:1:1.) | C 55.35<br>H 3.32<br>N 13.83<br>(303.78) | C 55.46<br>H 3.45<br>N 13.60 | 334/16,600<br>294/17,400<br><br>SS-WB |
| 20 | pyridyl-thiadiazole-C6H3(OCH3)2 | 67.2 | Almost colorless, very fine needles. M.P.=212.4–213.4° (ethanol-water) 1:1. | C 60.18<br>H 4.38<br>N 14.04<br>(299.34) | C 60.23<br>H 4.44<br>N 13.85 | 336/27,000<br><br>L-HB |
| 21 | pyridyl-thiadiazole-C6H3(OCH3)2 | 49.2 | Light yellow, felted needles. M.P.=181–182° (ethanol-water) 1:1. | C 60.18<br>H 4.38<br>N 14.04<br>(299.34) | C 60.23<br>H 4.52<br>N 13.79 | 351/12,800<br>298/16,000<br><br>L-BGr |
| 22 | pyridyl-thiadiazole-C6H2(OCH3)3 | 70.5 | Light yellow, felted needles. M.P.=167–168° (ethanol-water) 2:3. | C 58.34<br>H 4.59<br>N 12.76<br>(329.39) | C 58.27<br>H 4.70<br>N 12.65 | 330/19,800<br>258/9,900<br><br>L-GGr |

| No. | Formula | Yield in percent | Properties | Analysis (mol. wt.) Calculated | Analysis (mol. wt.) Found | $\lambda_{max}/\epsilon$ Fluorescence |
|---|---|---|---|---|---|---|
| 23 | 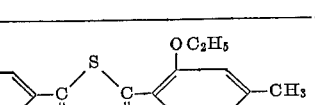 | 85.5 | Colorless, fine, felted needles. M.P.=171–172° (ethanol-water) 4:3. | C 64.62<br>H 5.08<br>N 14.13<br>(297.39) | C 64.26<br>H 5.13<br>N 14.25 | 332/21,900<br>304/15,600<br><br>St–B |
| 24 | 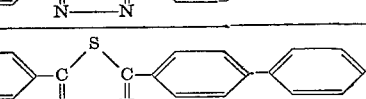 | 87.8 | Small colorless, shiny flakes. M.P.=241.4–242.8° (dioxane-water) 5:1. | C 72.35<br>H 4.15<br>N 13.32<br>(315.40) | C 72.10<br>H 4.16<br>N 13.21 | 325/30,000<br><br>L–B |
| 25 | 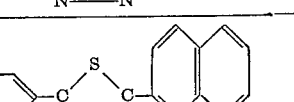 | 85.4 | Almost colorless, very fine crystals. M.P.=204.4–205.4° (dioxane-ethanol-water 2:1:1). | C 70.56<br>H 3.83<br>N 14.52<br>(289.37) | C 70.68<br>H 3.81<br>N 14.32 | 322/20,200<br>285/18,700<br>275/18,600<br>M–HV |
| | 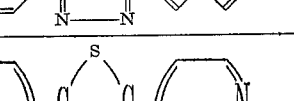 | 70.8 | Small, almost colorless, shiny flakes. M.P.=236.5–238° (dioxane-ethanol-water 4:3:3). | C 59.98<br>H 3.36<br>N 23.32 | C 60.16<br>H 3.41<br>N 23.38 | 292/20,700 |

| No. | Formula | Yield in percent | Properties | Analysis (mol. wt.) Calculated | Analysis (mol. wt.) Found | $\lambda_{max}/\epsilon$ Fluorescence |
|---|---|---|---|---|---|---|
| 38 | pyridyl-thiadiazole-C6H3(OCH3)(CH3) | 77 | Colorless, shiny needles and flakes. M.P.=160-160.5° (ethanol-water) 3:4. | C 63.58<br>H 4.62<br>N 14.83<br>(283.34) | C 63.66<br>H 4.73<br>N 14.95 | 326/23,100<br>302/17,900<br><br>M-WV |
| 39 | pyridyl-thiadiazole-C6H3(OCH3)(CH3) | 81.6 | Colorless, felted needles. M.P.=152.6-153.2° (ethanol-water) 3:4. | C 63.58<br>H 4.62<br>N 14.83<br>(283.34) | C 63.54<br>H 4.55<br>N 14.87 | 332/18,400<br>302/17,400<br><br>M-B |
| 40 | pyridyl-thiadiazole-C6H3(OCH3)(Cl) | 79.1 | Colorless, felted shiny needles. M.P.=199.4-199.8° (dioxane-ethanol-water 2:1:2). | C 55.35<br>H 3.32<br>N 13.83<br>(303.78) | C 55.21<br>H 3.11<br>N 13.77 | 332/18,200<br>295/18,000<br><br>S-V |
| 41 | pyridyl-thiadiazole-pyridyl | 90.8 | Colorless, felted needles. M.P.=219-219.2° (dioxane-ethanol-water 1:1:1). | C 59.98<br>H 3.36<br>N 23.32<br>(240.29) | C 60.27<br>H 3.30<br>N 23.01 | 311/23,200<br><br>SS-B |
| 42 | pyridyl-thiadiazole-C6H5 | 78.6 | Colorless, fine, felted needles. M.P.=139.2-141° (ethanol). | C 65.25<br>H 3.79<br>N 17.56<br>(239.59) | C 65.05<br>H 3.97<br>N 17.82 | 310/23,900<br><br>SS-B |
| 43 | pyridyl-thiadiazole-C6H4(CH3) | 83 | Almost colorless, felted needles. M.P.=119.5-120.2° (ethanol-water) 3:2. | C 66.38<br>H 4.38<br>N 16.59<br>(253.31) | C 66.32<br>H 4.48<br>N 16.82 | 312/24,600<br><br>nil |
| 44 | pyridyl-thiadiazole-C6H4-CH3 | 83.8 | Almost colorless, short needles. M.P.=144.6-146.8° (ethanol). | C 66.38<br>H 4.38<br>N 16.59<br>(253.31) | C 66.46<br>H 4.08<br>N 16.70 | 315/26,700<br><br>S-WB |
| 45 | pyridyl-thiadiazole-C6H4-C(CH3)3 | 88.1 | Almost colorless, fine needles. M.P.=121-122° (ethanol-water) 3:2. | C 69.12<br>H 5.80<br>N 14.23<br>(295.41) | C 68.93<br>H 6.09<br>N 14.18 | 315/26,800<br><br>nil |
| 46 | pyridyl-thiadiazole-C6H3(CH3)2 | 87 | Colorless, felted, shiny needles. M.P.=136.5-137.5° (ethanol-water) 3:1. | C 67.39<br>H 4.90<br>N 15.72<br>(267.34) | C 67.35<br>H 4.85<br>N 15.50 | 317/26,200<br><br>St-WB |
| 47 | pyridyl-thiadiazole-C6H4-Cl | 91.5 | Colorless, fine, shiny flakes. M.P.=197.5-198.8° (ethanol-dioxane) 2:1. | C 57.04<br>H 2.95<br>N 15.35<br>(273.75) | C 57.03<br>H 2.86<br>N 15.24 | 314/28,700<br><br>S-B |
| 48 | pyridyl-thiadiazole-C6H3Cl2 | 88.2 | Colorless, very fine crystals. M.P.=211.6-213.2° (dioxane-ethanol-water 3:1:1). | C 50.66<br>H 2.29<br>N 13.64<br>(308.20) | C 50.38<br>H 2.24<br>N 13.42 | 314/27,700<br><br>M-WB |
| 49 | pyridyl-thiadiazole-C6H4-OCH3 | 87.7 | Colorless, very fine, felted needles. M.P.=145-147° (ethanol). | C 62.43<br>H 4.12<br>N 15.60<br>(269.33) | C 62.26<br>H 4.06<br>N 15.78 | 325/27,400<br><br>L-B |
| 50 | pyridyl-thiadiazole-C6H3(OCH3)(CH3) | 87 | Colorless, shiny needles. M.P.=182-184° (ethanol). | C 63.58<br>H 4.62<br>N 14.83<br>(283.34) | C 63.69<br>H 4.70<br>N 14.74 | 333/25,700<br>305/17,000<br><br>St-B |
| 51 | pyridyl-thiadiazole-C6H3(OCH3)(Cl) | 71.2 | Colorless, fine, felted needles. M.P.=211.3-211.8° (ethanol-dioxane) 4:1. | C 55.35<br>H 3.32<br>N 13.83<br>(303.78) | C 55.27<br>H 3.32<br>N 13.73 | 335/20,600<br>307/18,800<br><br>M-B |
| 52 | pyridyl-thiadiazole-pyridyl | 69.1 | Colorless, shiny flakes. M.P.=201.3-202.7° (dioxane-ethanol-water 2:2:5). | C 59.98<br>H 3.36<br>N 23.32<br>S 13.34<br>(240.29) | C 59.78<br>H 3.62<br>N 23.25<br>S 13.36 | 303/24,800<br><br>nil |

Example 2

10 parts of phosphorus pentasulfide are stirred into a mixture of 8.03 parts of N-benzoyl-N'-isonicotinylhydrazine and 75 parts by volume of N:N-dimethylaniline, whereupon the mixture heats up slightly. The temperature is raised within 30 minutes to 60 to 65° C., the mixture is stirred for 1 hour at 60 to 65° C., the temperature is then raised within 1 hour to 110° C., and the reaction mixture is stirred for 12 hours at 110 to 115° C. The reaction mixture is then cooled to room temperature, treated with 50 parts by volume of ethanol and 500 parts of water and finally neutralized with aqueous sodium hydroxide solution. The N:N-dimethylaniline is removed with steam and the residue is cooled to room temperature, suctioned off, washed with cold water and dried. There are obtained about 6.8 parts (=85.2% of the theoretical yield) of 2-[pyridyl-(4')]-5-phenyl-1:3:4-thiadiazole of the Formula 5 in the form of a slightly greenish powder which melts at 172.8 to 181° C. Three recrystallizations from dioxane+water (1:1) yield about 4.1 parts (=51.4% of the theoretical yield) of pale-yellow, shiny flakes melting at 184.5 to 185° C.

When the 75 parts by volume of N:N-dimethylaniline are replaced by 75 parts by volume of quinoline, there are obtained about 6.5 parts (=81.5% of the theoretical yield) of 2-[pyridyl-(4')] - 5 - phenyl - 1:3:4-thiadiazole which on recrystallization from dioxane+water (1:1) yield about 3.0 parts (=37.6% of the theoretical yield) of almost colorless, shiny flakes melting at 176.5 to 182.4° C.

Example 3

15 parts of phosphorus pentasulfide are stirred into a mixture of 11.5 parts of N-furoyl-N'-benzoyl-hydrazine and 100 parts by volume of pyridine, whereupon the reaction mixture heats up. When the exothermic reaction has subsided, the temperature is raised within 30 minutes to 60 to 65° C., the mixture is stirred for 1 hour at 60–65° C. and then raised within 1 hour to the refluxing point, and the yellow reaction solution is stirred for 15 hours at a gentle boil, and then cooled to room temperature. 50 parts by volume of ethanol and then 2500 parts of ice water are added in several portions and the whole is neutralized with aqueous sodium hydroxide solution. The 2-[furyl-(2')]-5-phenyl-1:3:4-thiadiazole of the formula

(53) 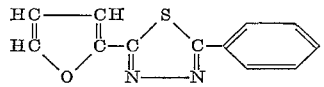

is suctioned off, washed with cold water and dried. Yield: about 6.5 parts (=57% of the theoretical) of an almost colorless, crystalline powder which melts at 107 to 107.6° C. After having been recrystallized five times from ethanol+water (3:2) it forms colorless, shiny needles which melt at 108.2 to 109.2° C. and in ultraviolet light display weak blue fluorescence.

*Analysis.*—$C_{12}H_8ON_2S$. Molecular weight: 228.28.

|  | C | H | N | S |
|---|---|---|---|---|
| Calculated, percent | 63.14 | 3.54 | 12.28 | 14.05 |
| Found, percent | 63.15 | 3.43 | 12.31 | 13.75 |

Ultra-violet absorption in dioxane: $\lambda_{max} = 321\ m\mu$ $(\epsilon = 30,700)$ The following table lists further 1:3:4-thiadiazoles that can be prepared as described above. The yields refer to the crude product. For the significance of the abbreviations in the fluorescence column see Example 1.

| No. | Formula | Yield in percent | Properties | Analysis (mol. wt.) Calculated | Found | $\lambda_{max}/\epsilon$ Fluorescence |
|---|---|---|---|---|---|---|
| 54 | (furyl-thiadiazole-phenyl-CH₃) | 81 | Almost colorless, very fine, shiny crystals. M.P.=110.1–110.3° (ethanol-water) 1:1. | C 64.44<br>H 4.16<br>N 11.56<br>(242.29) | C 64.54<br>H 4.09<br>N 11.73 | 324/27,900<br><br>M-B |
| 55 | (furyl-thiadiazole-phenyl-C(CH₃)₃) | 40.1 | Almost colorless, shiny needles. M.P.=78.8–79.6° (ethanol-water) 5:3. | C 67.58<br>H 5.67<br>N 9.85<br>(284.39) | C 67.33<br>H 5.68<br>N 9.84 | 324/28,300<br><br>S-B |
| 56 | (furyl-thiadiazole-phenyl-Cl) | 97.4 | Colorless, shiny needles. M.P.=143.8–144.6° (ethanol-water) 3:1. | C 54.86<br>H 2.69<br>N 10.66<br>(262.73) | C 55.07<br>H 2.79<br>N 10.62 | 325/27,800<br><br>S-B |
| 57 | (furyl-thiadiazole-phenyl-Cl,Cl) | 89.9 | Very small colorless, shiny flakes. M.P.=159.8–160.7° (ethanol-water) 4:1. | C 48.50<br>H 2.04<br>N 9.43<br>(297.18) | C 48.04<br>H 2.06<br>N 9.27 | 326/27,500<br><br>SS-B |
| 58 | (furyl-thiadiazole-phenyl-OCH₃) | 54.3 | Colorless, very fine needles. M.P.=147–148° (ethanol-water) 1:1. | C 60.45<br>H 3.90<br>N 10.85<br>(258.31) | C 60.66<br>H 3.99<br>N 11.11 | 331/25,300<br><br>S-WB |
| 59 | (furyl-thiadiazole-phenyl-OCH₃) | 93.7 | Almost colorless, felted needles. M.P.=102.1–103.1° (ethanol-water) 1:1. | C 60.45<br>H 3.90<br>N 10.85<br>(258.31) | C 60.52<br>H 4.05<br>N 11.05 | 330/30,800<br><br>S-WB |
| 60 | (furyl-thiadiazole-biphenyl) | 84 | Very small colorless, shiny flakes. M.P.=170.6–172° (dioxane-water) 5:2. | C 71.03<br>H 3.97<br>N 9.20<br>(304.38) | C 71.20<br>H 4.17<br>N 9.08 | 334/37,100<br><br>St-B |
| 61 | (furyl-thiadiazole-naphthyl) | 68.2 | Pale-yellow, shiny flakes. M.P.=141.8–143.4° (dioxane-water) 5:3. | C 69.04<br>H 3.62<br>N 10.07<br>(278.34) | C 69.15<br>H 3.55<br>N 10.18 | 333/29,400<br>293/15,800<br>SS-WB |

| No. | Formula | Yield in percent | Properties | Analysis (mol. wt.) Calculated | Analysis (mol. wt.) Found | $\lambda_{max}/\epsilon$ Fluorescence |
|---|---|---|---|---|---|---|
| 62 | (structure) | 66.9 | Colorless, very fine, felted needles. M.P.=175.4–176.6° (ethanol-water) 2:1. | C 57.63<br>H 3.08<br>N 18.33<br>(229.27) | C 57.65<br>H 3.05<br>N 18.40 | 323/22,800<br><br>S–B |
| 63 | (structure) | 74.3 | Pale-yellow, very fine, felted needles. M.P.=117.6–118.4° (ethanol-water) 1:3. | C 55.04<br>H 2.77<br>N 12.84<br>(218.24) | C 54.89<br>H 2.56<br>N 12.78 | 332/24,200<br><br>SS–B |
| 64 | (structure) | 84.9 | Pale-yellow, shiny flakes. M.P.=165–165.6° (dioxane-water) 2:1. | C 48.50<br>H 2.04<br>N 9.43<br>(297.18) | C 58.31<br>H 1.76<br>N 9.42 | 323/25,800<br><br>nil |
| 65 | (structure) | 69.5 | Pale-yellow, very fine, felted needles. M.P.=219–219.8° (dioxane-water) 6:1. | C 43.46<br>H 1.52<br>N 8.45<br>(331.63) | C 43.58<br>H 1.35<br>N 8.59 | 326/28,800<br><br>SS–GrB |
| 66 | (structure) | 71.5 | Light-yellow very fine, felted needles. M.P.=185.6–186° (dioxane-water) 3:1. | C 47.72<br>H 2.46<br>N 8.56<br>(327.20) | C 47.84<br>H 2.50<br>N 8.70 | 334/29,800<br><br>SS–GrB |
| 67 | (structure) | 56.4 | Almost colorless, very fine, felted needles. M.P.=162.6–164.6° (ethanol-water) 5:2. | C 44.31<br>H 1.69<br>N 14.09<br>(298.16) | C 43.89<br>H 1.70<br>N 13.99 | 323/24,400<br><br>S–B |
| 68 | (structure) | 86.7 | Light-yellow, very fine, felted needles. M.P.=229.8–230.7° (dioxane-water) 3:1. | C 33.74<br>H 0.56<br>N 7.87<br>(356.04) | C 34.03<br>H 0.59<br>N 8.02 | 348/29,500<br>337/29,600<br>L–BGr |

Example 4

7.1 parts of thiophene-2-carboxylic acid hydrazide are stirred in 100 parts by volume of pyridine and then cooled below 5° C. 7.73 parts of para-methylbenzoylchloride are then added dropwise at 0 to 5° C., and the whole is stirred for 45 minutes at 0 to 5° C. and then for 45 minutes longer at room temperature. In the course of 1 hour the pale-yellow reaction solution is heated to 80 to 85° C. and then stirred for another 3 hours at this temperature. The solution is cooled to room temperature and treated with 15 parts of phosphorus pentasulfide, whereupon the reaction mixture heats up. When the exothermic reaction has subsided, the temperature is adjusted to 60° C. and the mixture is stirred for 1 hour longer at 60 to 65° C. The temperature is finally raised within 1 hour to the refluxing point, and the yellow reaction solution is stirred for 12 hours at a gentle boil, and then cooled to room temperature. 50 parts by volume of ethanol and then 2500 parts of ice water are added in several portions and the whole is neutralized with aqueous sodium hydroxide solution. The 2-[thienyl-(2′)]-5-[4″-methylphenyl-(1″)]-1:3:4-thiadiazole of the formula

(69) 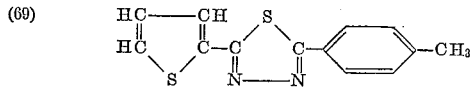

is suctioned off, washed with much cold water and dried. The yellowish crude product is recrystallized from ethanol+water (2:1) with the aid of active carbon. Yield: about 7.8 parts (=60.5% of the theoretical) of a pale-yellow crystalline powder which melts at 136 to 137.2° C. Two recrystallizations from ethanol+water (2:1) yield 6.5 parts (=50.4% of the theoretical yield of pale-yellow, shiny flakes which melt at 137.2 to 138° C. and display in ultra-violet light pale-blue fluorescence.

*Analysis.*—$C_{13}H_{10}N_2S_2$. Molecular weight: 258.36.

| | C | H | N |
|---|---|---|---|
| Calculated, percent | 60.44 | 3.90 | 10.84 |
| Found, percent | 60.57 | 3.93 | 10.91 |

Ultra-violet absorption in dioxane: $\lambda_{max}$=329 m$\mu$ ($\epsilon$=21,100); $\lambda_{max}$=270 m$\mu$ ($\epsilon$=5100).

The following table lists further 1:3:4-thiadiazoles that can be prepared as described above. The yields refer to the crude product after one recrystallization. The abbreviations in the fluorescence column have the same significance as in Example 1.

| No. | Formula | Yield in percent | Properties | Analysis (mol. wt.) Calculated | Analysis (mol. wt.) Found | $\lambda_{max}/\epsilon$ Fluorescence |
|---|---|---|---|---|---|---|
| 70 | [structure] | 69.4 | Colorless, felted needles. M.P.=109.4–110° (ethanol-water) 4:1. | C 63.96<br>H 5.37<br>N 9.32<br>(300.45) | C 63.71<br>H 5.46<br>N 9.20 | 329/26,600<br>270/6,400<br>S–B |
| 71 | [structure] | 54.3 | Colorless, shiny flakes. M.P.=170.4–171.2° (ethanol-water) 3:1. | C 61.73<br>H 4.44<br>N 10.29<br>(272.40) | C 61.96<br>H 4.40<br>N 10.14 | 330/23,000<br>268/5,800<br>M–B |
| 72 | [structure] | 70.6 | Colorless, felted needles. M.P.=122.2–122.8° (ethanol). | C 51.70<br>H 2.53<br>N 10.05<br>(278.79) | C 51.82<br>H 2.39<br>N 9.80 | 328/22,900<br>267/6,600<br>S–B |
| 73 | [structure] | 67 | Colorless, very fine needles. M.P.=168.6–169.2° (dioxane-water) 2:1. | C 51.70<br>H 2.53<br>N 10.05<br>(278.79) | C 51.61<br>H 2.34<br>N 10.03 | 330/26,000<br>272/7,000<br>S–B |
| 74 | [structure] | 53.8 | Colorless, very fine, needles. M.P.=179.5–180° (ethanol-water) 9:1. | C 46.01<br>H 1.93<br>N 8.94<br>(313.24) | C 46.41<br>H 1.88<br>N 8.98 | 331/23,300<br>270/6,600<br>S–HB |
| 75 | [structure] | 87.5 | Pale-yellow, shiny flakes. M.P.=166.4–167.6° (ethanol). | C 56.91<br>H 3.67<br>N 10.21<br>(274.37) | C 56.92<br>H 3.56<br>N 10.40 | 336/27,200<br>268/5,300<br>M–Grb |
| 76 | [structure] | 30.5 | Almost colorless, shiny needles. M.P.=191–191.6° (ethanol-water) 2:1. | C 58.31<br>H 4.19<br>N 9.71<br>(288.40) | C 58.54<br>H 4.04<br>N 9.70 | 335/23,800<br>268/5,300<br>S–WB |
| 77 | [structure] | 54.8 | Almost colorless very fine, felted needles. M.P.=132.2–132.8° (ethanol-water) 1:1. | C 58.31<br>H 4.19<br>N 9.71<br>(288.40) | C 58.15<br>H 3.99<br>N 9.70 | 340/2,100<br>267/5,500<br>S–WV |
| 78 | [structure] | 74.9 | Very small colorless shiny needles. M.P.=212–212.6° (dioxane-ethanol) 5:1. | C 67.47<br>H 3.78<br>N 8.74<br>(320.41) | C 67.55<br>H 3.95<br>N 8.69 | 339/36,000<br>St–B |
| 79 | [structure] | 84.9 | Almost colorless, very fine needles. M.P.=165–167° (ethanol-water) 4:1 | C 65.28<br>H 3.42<br>N 9.52<br>(294.38) | C 65.18<br>H 3.29<br>N 9.39 | 338/29,600<br>295/13,300<br>262/14,800<br>St–WB |
| 80 | [structure] | 64.3 | Colorless, very fine, felted needles. M.P.=168–169° (dioxane-ethanol-water 2:2:3). | C 53.85<br>H 2.88<br>N 17.13<br>(245.33) | C 54.10<br>H 3.02<br>N 17.26 | 327//22,100<br>267/6,300<br>M–H GrB |
| 81 | [structure] | 64.4 | Pale-yellow, fine shiny needles. M.P.=157.2–157.8° (ethanol). | C 47.97<br>H 2.42<br>N 11.19<br>S 38.42<br>(250.37) | C 47.92<br>H 2.78<br>N 11.30<br>S 38.34 | 342/23,500<br>267/6,000<br>S–B Gr |
| 82 | [structure] | 90.8 | Pale-yellow, very fine, felted needles. M.P.=165–166° (ethanol-water) 2:1. | C 62.90<br>H 4.93<br>N 9.78<br>(286.41) | C 62.73<br>H 4.86<br>N 10.06 | 337/26,000<br>273/6,700<br>S–BGr |
| 83 | [structure] | 86 | Almost colorless, fine crystalline powder. M.P.=187.8–188.2° (ethanol-water) 2:1. | C 65.81<br>H 6.14<br>N 8.53<br>(328.51) | C 65.75<br>H 6.10<br>N 8.60 | 338/25,900<br>273/6,700<br>St–GrB |
| 84 | [structure] | 70.7 | Colorless, very fine, felted needles. M.P.=146.6–147.4° (ethanol-water) 5:2. | C 63.96<br>H 5.37<br>N 9.32<br>(300.45) | C 64.11<br>H 5.43<br>N 9.50 | 338/27,400<br>274/6,700<br>M–B |

| No. | Formula | Yield in percent | Properties | Analysis (mol. wt.) Calculated | Analysis (mol. wt.) Found | $\lambda_{max}/\epsilon$ Fluorescence |
|---|---|---|---|---|---|---|
| 85 | [Structure: thiophene-thiadiazole-phenyl-Cl with CH3] | 71.8 | Almost colorless, very fine, felted needles. M.P.=168–169° (dioxane-water) 6:5. | C 54.80<br>H 3.61<br>N 9.13<br>(306.85) | C 54.73<br>H 3.37<br>N 9.23 | 341/25,900<br>271/7,300<br>St-GrB |
| 86 | [Structure: thiophene-thiadiazole-dichlorophenyl with CH3] | 72.2 | Light-yellow, shiny needles. M.P.=170.8–171.4° (ethanol-dioxane-water 9:3:1). | C 49.27<br>H 2.95<br>N 8.21<br>(341.30) | C 49.40<br>H 2.94<br>N 8.18 | 345/26,500<br>270/7,700<br>S-BGr |
| 87 | [Structure: thiophene-thiadiazole-phenyl-OCH3 with CH3] | 86.1 | Colorless, shiny needles. M.P.=170.8–171.6° (dioxane-ethanol-water 1:1:1). | C 59.57<br>H 4.67<br>N 9.26<br>(302.43) | C 59.73<br>H 4.71<br>N 9.28 | 341/29,700<br>278/7,100<br>S-B |
| 88 | [Structure: thiophene-thiadiazole-dimethyl substituted phenyl-OCH3] | 20 | Weakly beige-brown shiny, felted needles. M.P.=139.2–139.6° (methanol-water) 1:1. | C 60.73<br>H 5.10<br>N 8.85<br>(316.45) | C 60.94<br>H 5.05<br>N 8.63 | 348/27,100<br>270/6,200<br>SS-G |
| 89 | [Structure: thiophene-thiadiazole-dimethoxyphenyl] | 66.8 | Pale-yellow, very fine, felted needles. M.P.=182–182.5° (dioxane-water) 1:1. | C 57.81<br>H 4.85<br>N 8.43<br>(332.45) | C 57.82<br>H 4.67<br>N 8.45 | 347/29,400<br>275/6,400<br>L-GrB |
| 90 | [Structure: thiophene-thiadiazole-furan with CH3] | 87.7 | Pale-yellow, finely crystalline powder. M.P.=142.8–144.2° (methanol-water) 2:1. | C 54.94<br>H 3.84<br>N 10.68<br>S 24.44<br>(262.36) | C 55.13<br>H 3.95<br>N 10.67<br>S 24.60 | 345/26,500<br>278/5,700<br>S-GrB |

Example 5

10.2 parts of the diacylhydrazine of the formula (91)

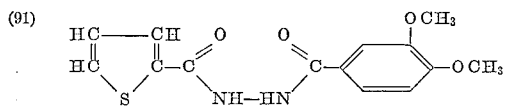

(which can be prepared by reacting 1 molecular proportion of 3:4-dimethoxybenzoyl chloride with 1 molecular proportion of thiophene-2-carboxylic acid hydrazide in pyridine) in 100 parts by volume of 4-picoline are treated with 15 parts of phosphorus pentasulfide, whereupon the reaction mixture heats up. When a temperature rise can no longer be observed, the temperature is raised within 15 minutes to 60 to 65° C. The mixture is stirred for 1 hour at 60 to 65° C., the temperature is raised within 1 hour to the boil and the yellow reaction solution is stirred for 12 hours under a slight reflux, during which the reaction product gradually crystallizes out. The whole is cooled to room temperature, 50 parts by volume of ethanol and then 2500 parts of ice water are added in several portions, and the whole is finally neutralized with aqueous sodium hydroxide solution. The product is suctioned off, washed with cold water and dried, to give a yield of about 8.05 parts (=79.4% of the theoretical) of 2-[thienyl - (2')] - 5 - [3":4" - dimethoxyphenyl - (1")]-1:3:4-thiadiazole of the formula (92)

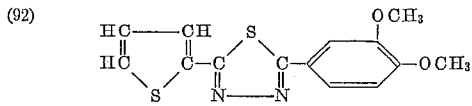

in the form of pale-yellow fine crystals which melt at 155.6 to 156.8° C. Three recrystallizations from ethanol+water (3:4) produce very fine, pale-yellow needles melting at 158.8 to 159.1° C. which in ultra-violet light display weak blue fluorescence.

*Analysis.*—$C_{14}H_{12}O_2N_2S_2$. Molecular weight: 304.40.

| | C | H | N |
|---|---|---|---|
| Calculated, percent | 55.24 | 3.97 | 9.20 |
| Found, percent | 55.29 | 3.88 | 9.12 |

Ultra-violet absorption in dioxane: $\lambda_{max}=342$ m$\mu$ ($\epsilon=26,800$).

When the 10 parts of phosphorus pentasulfide are replaced by 15 parts of phosphorus trisulfide, the yield amounts to about 7.0 parts (=69.1% of the theoretical) of 2 - [thienyl - (2')] - 5 - [3":4" - dimethoxyphenyl-(1")]-1:3:4-thiadiazole which after four recrystallizations from ethanol+water (1:1) forms a pale-yellow crystalline powder which melts at 158.5° C. to 158.9° C.

The identical thiazole derivative is obtained by using instead of 15 parts of phosphorus trisulfide 15 parts of phosphorus sesquisulfide or of phosphorus heptasulfide.

The following table lists further 1:3:4-thiadiazoles which can be prepared with phosphorus pentasulfide as described above. The yields refer to the crude product. The significance of the abbreviations in the fluorescence column is the same as in Example 1.

| No. | Formula | Yield in percent | Properties | Analysis (mol. wt.) Calculated | Analysis (mol. wt.) Found | $\lambda_{max}/\epsilon$ Fluorescence |
|---|---|---|---|---|---|---|
| 93 | (structure) | 90.4 | Colorless, very fine needles. M.P.=134.9–135.4° (ethanol-water) 1:1. | C 58.99<br>H 3.30<br>N 11.47<br>(244.32) | C 59.06<br>H 3.31<br>N 11.22 | 326/23,300<br>268/7,200<br>M–B |
| 94 | (structure) | 98 | Light-yellow shiny needles. M.P.=163.2–165.2° (ethanol-water) 2:1. | C 57.11<br>H 4.06<br>N 15.37<br>(273.39) | C 57.18<br>H 4.00<br>N 15.07 | 348/25,200<br>268/6,400<br>M–BGr |
| 95 | (structure) | 86 | Pale-yellow, very fine, felted needles. M.P.=133.2–135° (ethanol-water) 1:2. | C 57.11<br>H 4.06<br>N 15.37<br>(273.39) | C 56.81<br>H 4.61<br>N 15.35 | 340/23,100<br>273/6,800<br>M–BGr |

*Example 6*

13.07 parts of the bis-diacylhydrazine of the formula

(96)
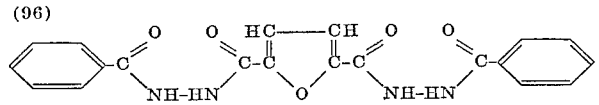

(which can be prepared by reacting 2 molecular proportions of benzoylchloride with 1 molecular proportion of furan-2:5-dicarboxylic acid dihydrazide in pyridine) in 150 parts by volume of pyridine are treated while being stirred with 20 parts of phosphorus pentasulfide, whereupon the reaction mixture heats up. When the temperature rises no longer, the reaction mixture is raised to the boil within 2½ hours. The solution, which is now clear, is stirred for 20 hours at a gentle boil, during which the reaction product gradually crystallizes out. The whole is cooled to room temperature, 50 parts by volume of ethanol and then 2000 parts of water are added in several portions, and the mixture is finally neutralized with aqueous sodium hydroxide solution. The product is suctioned off, washed with cold water and then with hot water and dried. Yield: about 12.9 parts (=100% of the theoretical) of 2-[5'-phenyl (1''')-1':3':4'-thiadiazolyl - (2')] - 5 - [5'' - phenyl (1'''') - 1'':3'':4'' - thiadiazolyl - (2'')] - furan of the formula

(97)
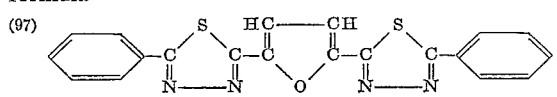

in the form of a yellow powder which melts at 258 to 265° C. Yield after three recrystallizations from ortho-dichlorobenzene: 8.4 parts (=64.9% of the theoretical) of yellow, very fine, felted needles which melt at 264 to 265° C. and display in ultra-violet light strong yellow fluorescence.

*Analysis.*—$C_{20}H_{12}ON_4S_2$. Molecular weight: 388.48.

|  | C | H | N |
|---|---|---|---|
| Calculated, percent | 61.84 | 3.11 | 14.42 |
| Found, percent | 61.73 | 3.12 | 14.20 |

Ultra-violet absorption in dioxane: $\lambda_{max}=374$ m$\mu$ ($\epsilon=38,400$); $\lambda_{max}=365$ m$\mu$ ($\epsilon=38,600$); $\lambda_{max}=299$ m$\mu$ ($\epsilon=17,200$).

The following table lists further 1:3:4-thiadiazoles that can be obtained as described above. The yields refer to the crude product. Owing to the sparing solubility of the compounds concerned, the $\epsilon$-values marked + are unreliable. The abbreviations in the fluorescence column have the same significance as in Example 1.

| No. | Formula | Yield in percent | Properties | Analysis (mol. wt.) Calculated | Analysis (mol. wt.) Found | $\lambda_{max}/\epsilon$ Fluorescence |
|---|---|---|---|---|---|---|
| 98 | (structure) | 100 | Pale-yellow crystalline powder. M.P.=215–218° (chlorobenzene). | C 63.44<br>H 3.87<br>N 13.45<br>(416.53) | C 63.22<br>H 3.87<br>N 13.35 | 375/37,000<br>366/37,000<br>302/17,400<br>St–GrG |
| 99 | (structure) | 100 | Pale-yellow crystalline powder. M.P.=288–291° (o-dichlorobenzene). | C 63.44<br>H 3.87<br>N 13.45<br>(416.53) | C 63.16<br>H 4.24<br>N 13.42 | 378/37,600<br>367/38,000<br>305/19,400<br>L–G |

| No. | Formula | Yield in percent | Properties | Analysis (mol. wt.) Calculated | Analysis (mol. wt.) Found | $\lambda_{max}/\epsilon$ Fluorescence |
|---|---|---|---|---|---|---|
| 100 | [structure with H₃C-C(CH₃)(CH₃)-C₆H₄- thiadiazole and furan-thiadiazole-C₆H₄-C(CH₃)₃] | 100 | Pale-yellow crystalline powder. M.P.=above 300° (dioxane-water) 9:1. | C 67.17<br>H 5.64<br>N 11.19<br>(500.70) | C 67.15<br>H 5.75<br>N 11.15 | 378/42,000<br>368/42,100<br>305/23,000<br>L-G Gr |
| 101 | [H₃C, H₃C-C₆H₃- thiadiazole and furan-thiadiazole-C₆H₃-CH₃, CH₃] | 98.6 | Brilliantly light-yellow, crystalline powder. M.P.= 280.4–281° (chlorobenzene). | C 64.84<br>H 4.53<br>N 12.60<br>(444.59) | C 64.78<br>H 4.67<br>N 12.68 | 379/34,000<br>368/34,000<br>310/18,000<br>L-G |
| 102 | [Cl-C₆H₄- thiadiazole and furan-thiadiazole-C₆H₄-Cl] | 100 | Light-yellow finely crystalline powder. M.P.=above 300° (o-dichlorobenzene). | C 52.52<br>H 2.20<br>N 12.25<br>(457.38) | C 52.54<br>H 2.39<br>N 12.27 | 376/38,000<br>366/38,000<br>305/17,000<br>M-G |
| 103 | [Cl-C₆H₄- thiadiazole and furan-thiadiazole-C₆H₄-Cl] | 90.6 | Light-yellow, fine, shiny flakes. M.P.=above 300° (trichlorobenzene). | C 52.52<br>H 2.20<br>N 12.25<br>(457.38) | C 52.34<br>H 2.00<br>N 12.35 | +378/29,900<br>+367/30,000<br>306/13,000<br>L-G |
| 104 | [H₃CO-C₆H₄- thiadiazole and furan-thiadiazole-C₆H₄-OCH₃] | 100 | Brilliantly light-yellow, fine, felted needles. M.P.=291–291.8° (o-dichlorobenzene). | C 58.91<br>H 3.60<br>N 12.49<br>(448.53) | C 58.92<br>H 3.65<br>N 12.39 | 381/40,200<br>369/40,000<br>327/23,600<br>L-G |
| 105 | [H₃CO-C₆H₄- thiadiazole and furan-thiadiazole-C₆H₄-OCH₃] | 100 | Brilliantly light-yellow, fine, felted needles. M.P.=210–211.6° (chlorobenzene). | C 58.91<br>H 3.60<br>N 12.49<br>(448.53) | C 58.76<br>H 3.86<br>N 12.44 | 377/38,400<br>366/38,200<br>L-G |
| 106 | [H₃CO-C₆H₄- thiadiazole and furan-thiadiazole-C₆H₄-OCH₃] | 100 | Brilliantly yellow, felted needles. M.P.=292–294.4° (o-dichlorobenzene). | C 58.91<br>H 3.60<br>N 12.49<br>(448.53) | C 58.91<br>H 3.69<br>N 12.75 | 384/41,600<br>374/41,500<br>L-G |
| 107 | [(H₃CO)₃-C₆H₂- thiadiazole and furan-thiadiazole-C₆H₂-(OCH₃)₃] | 77.5 | Brilliantly yellow, fine, felted needles. M.P.=262.4–264° (o-dichlorobenzene). | C 54.92<br>H 4.25<br>N 9.85<br>(568.64) | C 54.70<br>H 4.32<br>N 9.89 | 387/41,500<br>376/40,500<br>333/24,000<br>S-G |

| No. | Formula | Yield in percent | Properties | Analysis (mol. wt.) Calculated | Analysis (mol. wt.) Found | $\lambda_{max}/\epsilon$ Fluorescence |
|---|---|---|---|---|---|---|
| 108 | 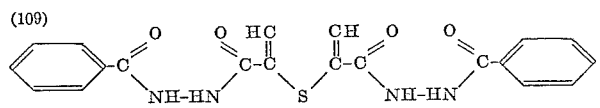 | 89.2 | Yellow, finely crystalline powder. M.P.=265–267° (o-dichlorobenzene). | C 47.98<br>H 2.01<br>N 13.99<br>(400.53) | C 47.84<br>H 1.91<br>N 13.98 | 392/37,500<br>381/36,600<br>332/20,500<br>S–G |

Example 7

10 parts of phosphorus pentasulfide are stirred into 6.82 parts of the bis-diacylhydrazine of the formula (109) 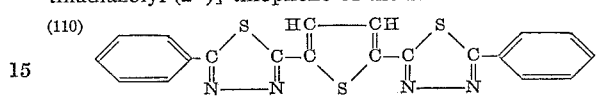

(which can be prepared by reacting 2 molecular proportions of benzoyl chloride with 1 molecular proportion of thiophene-2:5-dicarboxylic acid dihydrazide in pyridine) in 150 parts by volume of pyridine, whereupon the reaction mixture heats up. When a rise in temperature can no longer be observed, the reaction mixture is raised to the boil within 3 hours and then stirred on for 18 hours at a gentle boil, and then cooled to room temperature. 50 parts by volume of ethanol and then 2000 parts of water are added in several portions and the whole is neutralized with aqueous sodium hydroxide solution. The product is suctioned off, washed with cold and then with hot water and dried. The crude product is then recrystallized from 350 parts by volume of ortho-dichlorobenzene with the aid of active carbon. Yield: about 4.6 parts (=68.3% of the theoretical) of 2-[5′-phenyl-(1′″)-1′:3′:4′-thiadiazolyl - (2′)] - 5 - [5″ - phenyl - 1″″)-1″:3″:4″-thiadiazolyl-(2″)]-thiophene of the formula (110) [formula]

in the form of a light-yellow powder which melts above 300° C. After recrystallizing it twice from ortho-dichlorobenzene it forms a light-yellow, finely crystalline powder which displays yellow fluorescence in ultra-violet light.

*Analysis.*—$C_{20}H_{12}N_4S_3$. Molecular weight: 404.548.

|  | C | H | N | S |
|---|---|---|---|---|
| Calculated, percent | 59.38 | 2.99 | 13.85 | 23.78 |
| Found, percent | 59.20 | 3.10 | 13.87 | 23.81 |

Ultra-violet absorption in dioxane: $\lambda_{max}=381$ m$\mu$ ($\epsilon=14,800^+$); $\lambda_{max}=370$ m$\mu$ ($\epsilon=15,000^+$).

The following table lists further 1:3:4-thiadiazoles that can be prepared as described above. The yields refer to the crude product after one recrystallization. Owing to the sparing solubility of the products concerned, the $\epsilon$-values marked + are unreliable. The abbreviations in the fluorescence column have the same significance as in Example 1.

| No. | Formula | Yield in percent | Properties | Analysis (mol. wt.) Calculated | Analysis (mol. wt.) Found | $\lambda_{max}/\epsilon$ Fluorescence |
|---|---|---|---|---|---|---|
| 111 | [structure with H3C-phenyl-thiadiazolyl-thiophene-thiadiazolyl-phenyl-CH3] | 61.3 | Yellow, shiny, short needles. M.P.=291.2–292° (o-dichlorobenzene). | C 61.08<br>H 3.73<br>N 12.95<br>(432.60) | C 61.04<br>H 3.74<br>N 12.97 | 379/37,000<br>370/38,500<br>270/10,000<br>M–G |
| 112 | [structure with H3C-phenyl-thiadiazolyl-thiophene-thiadiazolyl-phenyl-CH3] | 62.4 | Golden-yellow, short, felted needles. M.P.=above 300° (trichlorobenzene). | C 61.08<br>H 3.73<br>N 12.95<br>(432.60) | C 60.94<br>H 3.70<br>N 12.81 | +385/26,500<br>+375/27,000<br>+272/8,500<br>St–G |
| 113 | [structure with tert-butyl-phenyl-thiadiazolyl-thiophene-thiadiazolyl-phenyl-C(CH3)3] | 59 | Small yellow, shiny flakes. M.P.=above 300° (o-dichlorobenzene). | C 65.08<br>H 5.46<br>N 10.8<br>(516.76) | C 65.04<br>H 5.43<br>N 10.84 | 384/40,500<br>375/40,800<br>275/11,500<br>St–G |
| 114 | [structure with dimethylphenyl-thiadiazolyl-thiophene-thiadiazolyl-dimethylphenyl] | 62 | Brilliantly yellow, fine, felted needles. M.P.=above 300° (o-dichlorobenzene). | C 62.58<br>H 4.38<br>N 12.16<br>(460.66) | C 62.48<br>H 4.67<br>N 12.45 | +380/28,000<br>+371/29,000<br>+275/10,500<br>St–G |

| No. | Formula | Yield in percent | Properties | Analysis (mol. wt.) Calculated | Analysis (mol. wt.) Found | $\lambda_{max}/\epsilon$ Fluorescence |
|---|---|---|---|---|---|---|
| 115 | *structure with two chlorophenyl groups* | 59.5 | Light-yellow finely crystalline powder. M.P.=above 300° (trichlorobenzene). | C 50.74<br>H 2.13<br>N 11.83<br>(473.45) | C 50.44<br>H 2.12<br>N 11.70 | +370/17,000<br><br>St-G |
| 116 | *structure with two 4-chlorophenyl groups* | 42.2 | Pale-yellow, shiny, very fine, felted needles. M.P.=above 300° (trichlorobenzene). | C 50.74<br>H 2.13<br>N 11.83<br>(473.45) | C 50.79<br>H 2.30<br>N 11.85 | 383/14,000<br>372/14,500<br>+272/4,900<br>L-G |
| 117 | *structure with two o-methoxyphenyl groups* | 40 | Small yellow, fine needles. M.P.=252-253.4° (o-dichlorobenzene). | C 56.87<br>H 3.47<br>N 12.06<br>(464.60) | C 56.57<br>H 3.56<br>N 11.93 | 385/42,000<br>373/42,000<br><br>M-G |
| 118 | *structure with two m-methoxyphenyl groups* | 72.5 | Yellow shiny fine flakes. M.P.=244.4-245° (o-dichlorobenzene). | C 56.87<br>H 3.47<br>N 12.06<br>(474.60) | C 57.10<br>H 3.71<br>N 11.95 | 382/42,200<br>372/42,500<br>264/10,500<br>St-G |
| 119 | *structure with two p-methoxyphenyl groups* | 60.3 | Yellow, very fine, felted needles. M.P.=above 300° (trichlorobenzene). | C 56.87<br>H 3.47<br>N 12.06<br>(464.60) | C 56.86<br>H 3.59<br>N 12.24 | +377/14,000<br><br>L-G |
| 120 | *structure with two dimethoxyphenyl groups* | 68.8 | Yellow, finely crystalline powder. M.P.=231.2-234.8° (o-dichlorobenzene). | C 54.94<br>H 3.84<br>N 10.68<br>(524.66) | C 55.01<br>H 3.80<br>N 10.49 | 393/38,500<br>382/39,000<br><br>SS-G |
| 121 | *structure with two naphthyl groups* | 61.5 | Yellow, finely crystalline powder. M.P.=above 300° (trichlorobenzene). | C 66.64<br>H 3.20<br>N 11.10<br>(504.67) | C 66.35<br>H 3.17<br>N 11.07 | 393/39,000<br>382/39,200<br><br>M-G |
| 122 | *structure with furyl end groups* | 65.2 | Yellow, finely crystalline powder. M.P.=above 300° (o-dichlorobenzene). | C 49.98<br>H 2.10<br>N 14.57<br>(384.47) | C 49.89<br>H 2.25<br>N 14.68 | 395/44,000<br>384/43,400<br>284/13,500<br>nil |
| 123 | *structure with thienyl end groups* | 74.6 | Yellow, shiny fine flakes. M.P.=above 300° (o-dichlorobenzene). | C 46.13<br>H 1.94<br>N 13.45<br>S 38.49 | C 45.85<br>H 1.93<br>N 13.67<br>S 38.29 | +393/20,000<br>+382/20,200<br><br>M-G |

27
Example 8

20 parts of phosphorus pentasulfide are stirred into 12.73 parts of the bis-diacylhydrazine of the formula

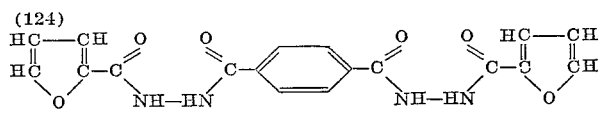

(which can be prepared by reacting 2 molecular proportions of furoylchloride with 1 molecular proportion of terephthalic acid dihydrazide in pyridine) in 150 parts by volume of pyridine, whereupon the reaction mixture heats up. When a temperature rise can no longer be observed, the reaction mixture is raised within 2½ hours to the boil and stirred for another 20 hours at a gentle boil, and then cooled to room temperature. 50 parts by volume of ethanol and then 2000 parts of water are added in several portions and the whole is neutralized with aqueous sodium hydroxide solution. The product is suctioned off, washed with cold and then with hot water and dried. Yield: about 12.4 parts (=98.1% of the theoretical) of 1-[5'-furyl-(2''')-1':3':4'-thiadiazolyl-(2')]-4-[5''-furyl-(2'''')-1'':3'':4''-thiadiazolyl-(2'')]-benzene of the formula

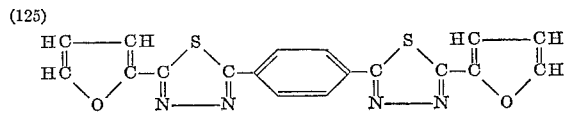

in the form of a yellowish powder which melts above 300° C. Yield after three recrystallizations from ortho-dichlorobenzene: 5.2 parts (=41.1% of the theoretical) of a weakly yellowish, finely crystalline powder.

*Analysis.*—$C_{18}H_{10}O_2N_4S_2$. Molecular weight: 378.44.

| | C | H | N |
|---|---|---|---|
| Calculated, percent | 57.13 | 2.66 | 14.81 |
| Found, percent | 57.18 | 2.86 | 14.89 |

Ultra-violet absorption in dioxane:

$\lambda_{max}=364$ m$\mu$($\epsilon=50,200$); $\lambda_{max}=355$ m$\mu$($\epsilon=50,100$; $\lambda_{max}=273$ m$\mu$($\epsilon=8,400$)

Example 9

A polyacrylonitrile fabric, for example "Orlon," is treated at a goods-to-liquor ratio of 1:40 with 0.1% of 2-[pyridyl-(4')]-5-[4''-tertiary butylphenyl-(1'')]-1:3:4-thiadiazole of the Formula 8 for 1 hour at about 70 to 97° C. in a bath which contains per liter 1 gram of formic acid of 85% strength, and then rinsed and dried. The fabric treated in this manner has a higher white content than the untreated material.

When the 2-[pyridyl-(4')]-5-[4''-tertiary butylphenyl-(1'')]-1:3:4-thiadiazole is replaced by an identical amount of the 2-[pyridyl-(4')]-5-[3'':4''-dimethylphenyl-(1'')]-1:3:4-thiadiazole of the Formula 9, a similar optical brightening effect is obtained.

Example 10

Films about 40$\mu$ thick are made from a 10% solution in acetone of acetylcellulose containing, calculated on acetylcellulose, 1% of 2-[3':5'-dimethylthienyl-(2')]-5-[4''-tertiary butylphenyl-(1'')]-1:3:4-thiadiazole of the Formula 83 and of 2-[3':5'-dimethylthienyl-(2'')]-5-[3'':4''-dimethoxyphenyl-(1'')]-1:3:4-thiadiazole of the Formula 89. After drying the following values of the permeability to light are obtained (measured with a Beckmann-DU-spectrophotometer):

| Permeability to light | 1:3:4-thiadiazole of the formula | | |
|---|---|---|---|
| | (83) | (89) | |
| 0% at | ~320–360 | ~320–380 | m$\mu$ |
| 5% at | 376.5 | 390.5 | m$\mu$ |
| 10% at | 379 | 393 | m$\mu$ |
| 25% at | 382.5 | 396.5 | m$\mu$ |
| 50% at | 387.5 | 400.5 | m$\mu$ |
| 75% at | 395 | ~405 | m$\mu$ |

What is claimed is:
1. A 1:3:4-thiadiazole of the formula

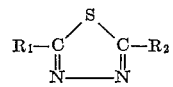

in which $R_1$ is pyridyl and $R_2$ is a member selected from the group consisting of

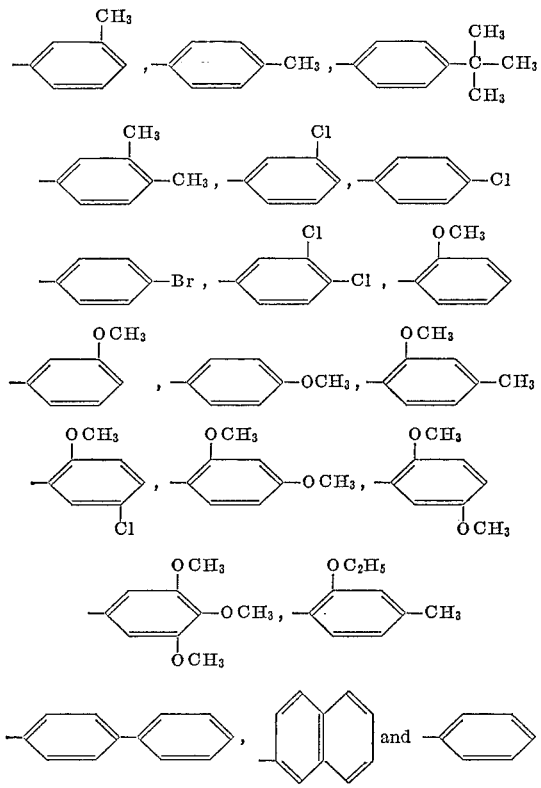

2. A 1:3:4-thiadiazole of the formula

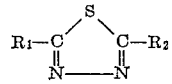

in which $R_1$ is a member selected from the group consisting of

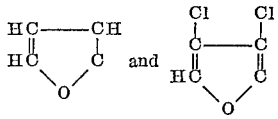

and $R_2$ is a member selected from the group consisting of

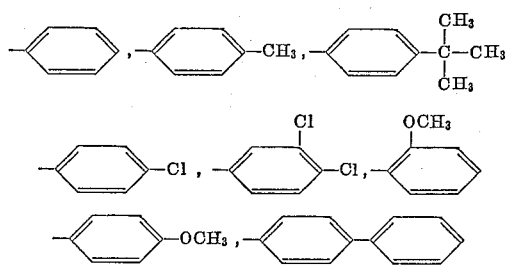

and

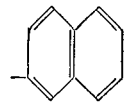

3. A 1:3:4-thiadiazole of the formula

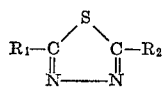

in which $R_1$ is a member selected from the group consisting of

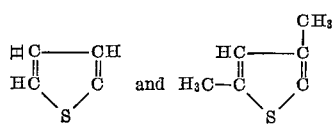

and $R_2$ is a member selected from the group consisting of

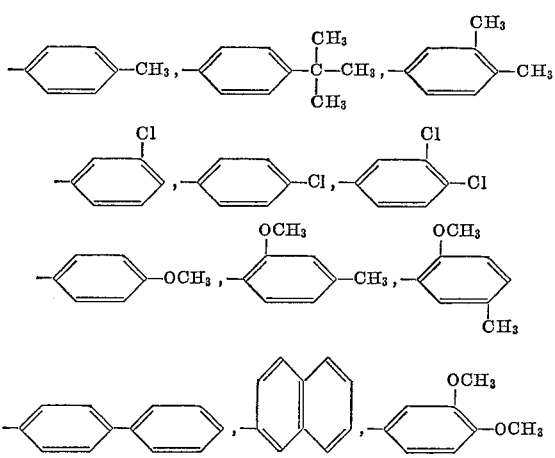

and

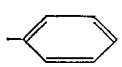

4. A 1:3:4-thiadiazole of the formula

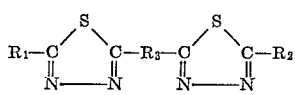

in which $R_3$ is furyl and $R_2$ and $R_1$ is each a member selected from the group consisting of

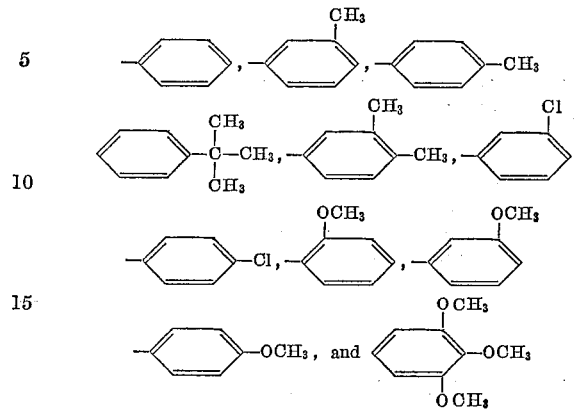

5. A 1:3:4-thiadiazole of the formula

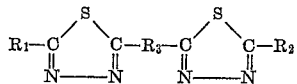

in which $R_3$ is thienyl and $R_1$ and $R_2$ is each a member selected from the group consisting of

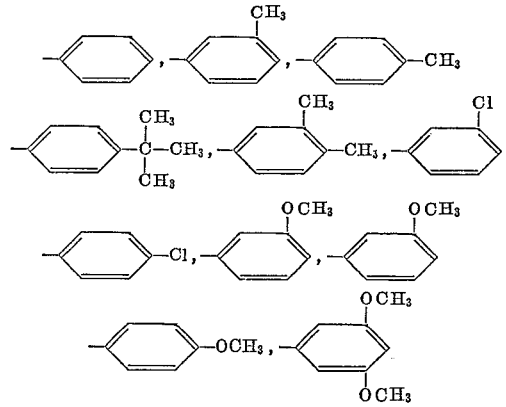

and

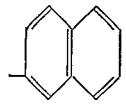

6. A 1:3:4-thiadiazole of the formula

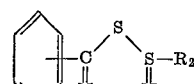

in which $R_2$ is phenyl.

7. A 1:3:4-thiadiazole of the formula

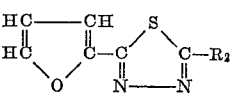

in which $R_2$ is phenyl.

8. A 1:3:4-thiadiazole of the formula

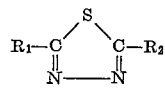

in which $R_1$ and $R_2$ each is furyl.

9. A 1:3:4-thiadiazole of the formula

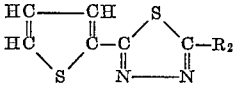

in which $R_2$ is phenyl.

10. A 1:3:4-thiadiazole of the formula

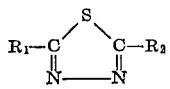

in which $R_1$ is thienyl and R is pyridyl.

11. A 1:3:4-thiadiazole of the formula

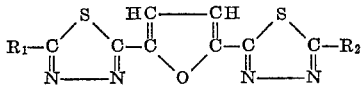

in which R and $R_1$ each is phenyl.

12. A 1:3:4-thiadiazole of the formula

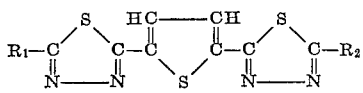

in which R and $R_1$ each is phenyl.

References Cited in the file of this patent

UNITED STATES PATENTS

| | | |
|---|---|---|
| 2,726,246 | Trosken et al. | Dec. 6, 1955 |
| 2,733,245 | Ainsworth | Jan. 31, 1956 |

OTHER REFERENCES

Charbrier et al.: Bull. Soc. Chim., France, 1949, pp. 237–40.

Bambas: "Heterocyclic Compounds" (Interscience), pp. 81–8 (1952).

McMillan et al.: J. Am. Pharm. Assoc., vol. 42. pp. 457–64 (1953).

Ohta et al.: J. Pharm. Soc., Japan, vol. 76, pp. 10–12 (1956).

IRVING MARCUS, *Primary Examiner.*

DUVAL T. McCUTCHEN, WALTER A. MODANCE,
*Examiners.*

UNITED STATES PATENT OFFICE
CERTIFICATE OF CORRECTION

Patent No. 3,178,440                                        April 13, 1965

Adolf Emil Siegrist et al.

It is hereby certified that error appears in the above numbered patent requiring correction and that the said Letters Patent should read as corrected below.

Column 30, lines 35 to 40, the center radical should appear as shown below instead of as in the patent:

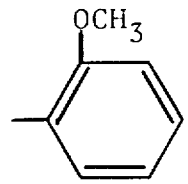

same column 30, lines 39 to 44, the right-hand radical should appear as shown below instead of as in the patent:

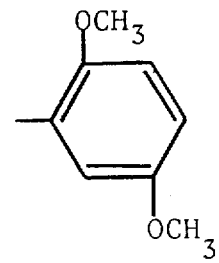

column 31, line 6, for "R" read -- $R_2$ --; lines 12 and 19, for "R and $R_1$", each occurrence, read -- $R_1$ and $R_2$ --.

Signed and sealed this 12th day of October 1965.

(SEAL)
Attest)

ERNEST W. SWIDER
Attesting Officer

EDWARD J. BRENNER
Commissioner of Patents